(12) United States Patent
Selvaggi et al.

(10) Patent No.: US 7,941,649 B2
(45) Date of Patent: *May 10, 2011

(54) SIMD PROCESSOR EXECUTING MIN/MAX INSTRUCTIONS

(75) Inventors: Richard J. Selvaggi, Doylestown, PA (US); Larry A. Pearlstein, Newtown, PA (US)

(73) Assignee: Broadcom Corporation, Irvine, CA (US)

( * ) Notice: Subject to any disclaimer, the term of this patent is extended or adjusted under 35 U.S.C. 154(b) by 169 days.

This patent is subject to a terminal disclaimer.

(21) Appl. No.: 12/231,891

(22) Filed: Sep. 5, 2008

(65) Prior Publication Data

US 2009/0132785 A1 May 21, 2009

Related U.S. Application Data

(63) Continuation of application No. 10/940,123, filed on Sep. 13, 2004, now Pat. No. 7,434,034.

(51) Int. Cl.
*G06F 9/305* (2006.01)

(52) U.S. Cl. ...................... 712/220; 712/221

(58) Field of Classification Search .................. None
See application file for complete search history.

(56) References Cited

U.S. PATENT DOCUMENTS

| | | | | |
|---|---|---|---|---|
| 4,774,688 A * | 9/1988 | Kobayashi et al. | ........... | 708/207 |
| 5,524,251 A * | 6/1996 | Urasaki | ........... | 708/207 |
| 5,715,186 A * | 2/1998 | Curtet | ........... | 708/207 |
| 5,991,785 A * | 11/1999 | Alidina et al. | ........... | 708/207 |
| 6,539,408 B1 * | 3/2003 | Gley et al. | ........... | 708/207 |
| 6,753,866 B2 * | 6/2004 | Suzuki et al. | ........... | 345/505 |
| 6,754,684 B1 * | 6/2004 | Kotlov | ........... | 708/202 |
| 7,072,922 B2 * | 7/2006 | Andreev et al. | ........... | 708/207 |
| 7,250,953 B2 * | 7/2007 | Hutchins et al. | ........... | 345/503 |
| 2003/0188143 A1 * | 10/2003 | Sheaffer | ........... | 712/236 |
| 2004/0148320 A1 * | 7/2004 | Zabarski et al. | ........... | 708/207 |

* cited by examiner

*Primary Examiner* — Eric Coleman
(74) *Attorney, Agent, or Firm* — McAndrews, Held & Malloy, Ltd.

(57) ABSTRACT

A SIMD processor responds to a single min/max instruction to find the minimum or maximum valued data unit in an array of data units. The determined minimum/maximum value and an associated index value thereto may be output. Alternatively, the value of a data unit in another array may be output at a corresponding location. A further single instruction executable by the SIMD processor, may be applied to results obtained using such a single min/max instruction, to allow such instructions to operate on two dimensional arrays.

38 Claims, 4 Drawing Sheets

SIMD PROCESSOR EXECUTING MIN/MAX INSTRUCTIONS

This application is a continuation of U.S. patent application Ser. No. 10/940,123 filed on Sep. 13, 2004, having as inventors Selvaggi, et al. and entitled "SIMD Processor Exchange Min/Max Instructions".

FIELD OF THE INVENTION

The present invention relates generally to processors, and more particularly to single instruction multiple data (SIMD) processors.

BACKGROUND OF THE INVENTION

SIMD processors are best suited to performing the same operation on multiple elements of data simultaneously. Typically, parallel processing portions of a single arithmetic logic unit (often viewed as individual parallel ALUs) operate on portions of operands simultaneously.

Specialized SIMD processors are particularly well suited for operating on data representing video. Processing of video, in turn, requires numerous specialized calculations.

For example, it is often desirable or required to locate the minimum or maximum value in a one or two dimensional array. This is, for example, useful in many motion estimation steps of video compression or noise reduction algorithms. A two dimensional array may represent an array of sums of absolute differences between pixels of a current two dimensional pixel block, and numerous candidate reference blocks. A further associated two dimensional array may represent an array of motion vectors, one associated with each pixel block. Locating the minimum or maximum entries of the array so formed, facilitates locating pixel blocks of greatest similarity or difference in two images, and associated motion vectors. Known media processors and digital signal processors typically locate maximum and minimum entries using a conventional minimum or maximum finding algorithm. Such algorithms typically require a series of conditional branches or conditional assignment instructions. As such, they require multiple processor clock cycles.

Clearly, then a processor capable of easily determining maximum or minimum entries within an array is desirable.

SUMMARY OF THE INVENTION

Accordingly, an enhanced SIMD processor responds to a single min/max instruction to find the minimum or maximum valued data unit in an array of data units. The operands may be stored within processor readable memory, or processor registers. The determined minimum/maximum value and an associated index value may be output. Alternatively, the value of a data unit in another array may be output. A further single instruction executable by the SIMD processor, may be applied to results obtained using such a single min/max instruction, to allow such instructions to operate on two dimensional arrays.

In accordance with an aspect of the present invention, a method of processing a single processor readable instruction, includes: (i) determining the minimum/maximum valued data unit in an array of data units; (ii) outputting a value of the minimum/maximum valued data unit; and (iii) outputting an index value indexing the minimum/maximum valued data unit in the array.

In accordance with another aspect of the present invention, a method of processing a single processor readable instruction, includes: (i) determining the minimum/maximum valued data unit in a first array of data units; (ii) determining an index value indexing the minimum/maximum valued data unit in the first array; (iii) outputting a value of the minimum/maximum valued data unit; and (iv) outputting a value of a data unit in a second array, indexed by the index value.

In accordance with yet another aspect of the present invention, a method of determining a minimum/maximum valued data unit in a plurality of arrays of data units includes: (i) for each of the plurality arrays, in response to a single processor instruction, forming an output including the minimum/maximum valued data unit in each array and an associated index value to the minimum/maximum valued data unit that array, and (ii) in response to another single processor readable instruction, determining and outputting the minimum/maximum valued data unit and its associated index, among the outputs determined in (i) and a second index value thereto.

In accordance with yet a further aspect of the present invention, a method of determining a minimum/maximum valued data unit in a P×P array of data units and a two dimension index thereto, includes (i) for each row in the P×P array, in response to a single processor instruction, forming an output including the minimum/maximum valued data unit that row and an associated index value identifying a column of the minimum/maximum valued data unit in the row; and (ii) in response to another single processor readable instruction, determining and outputting the minimum/maximum valued data unit and its associated index value, among the P outputs determined in (i) and a second index value thereto, thereby determining the minimum/maximum valued data unit in the P×P array, and the two dimensional index thereto.

In accordance with another aspect of the present invention, a method of determining a minimum/maximum valued data unit in a first P×P array of data units, and a value in a second P×P array of data units at a location corresponding to the minimum/maximum valued data unit in the first P×P array, includes (i) for each row in the first P×P array, in response to a single processor instruction, forming an output including the minimum/maximum valued data unit in each row of the first P×P array, and an associated value of a data unit in the second array at a location of the minimum/maximum valued data unit in the P×P array; (ii) in response to another single processor readable instruction, determining and outputting the minimum/maximum valued data unit and its associated value, among the P outputs determined in (i), thereby determining the minimum/maximum valued data unit in the P×P array, and a value in a second P×P array at a location corresponding to the minimum/maximum valued data unit in the first P×P array.

In accordance with a further aspect of the present invention, a single instruction multiple data (SIMD) processor includes an arithmetic logic unit (ALU) for receiving a P data unit array from operand storage. The ALU comprising P-1 comparators, for comparing the P data units in response to a single processor executable instruction, in order to determine a minimum/maximum one of the P data units.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate, by way of example only, embodiments of the present invention.

DETAILED DESCRIPTION

Figure 1:
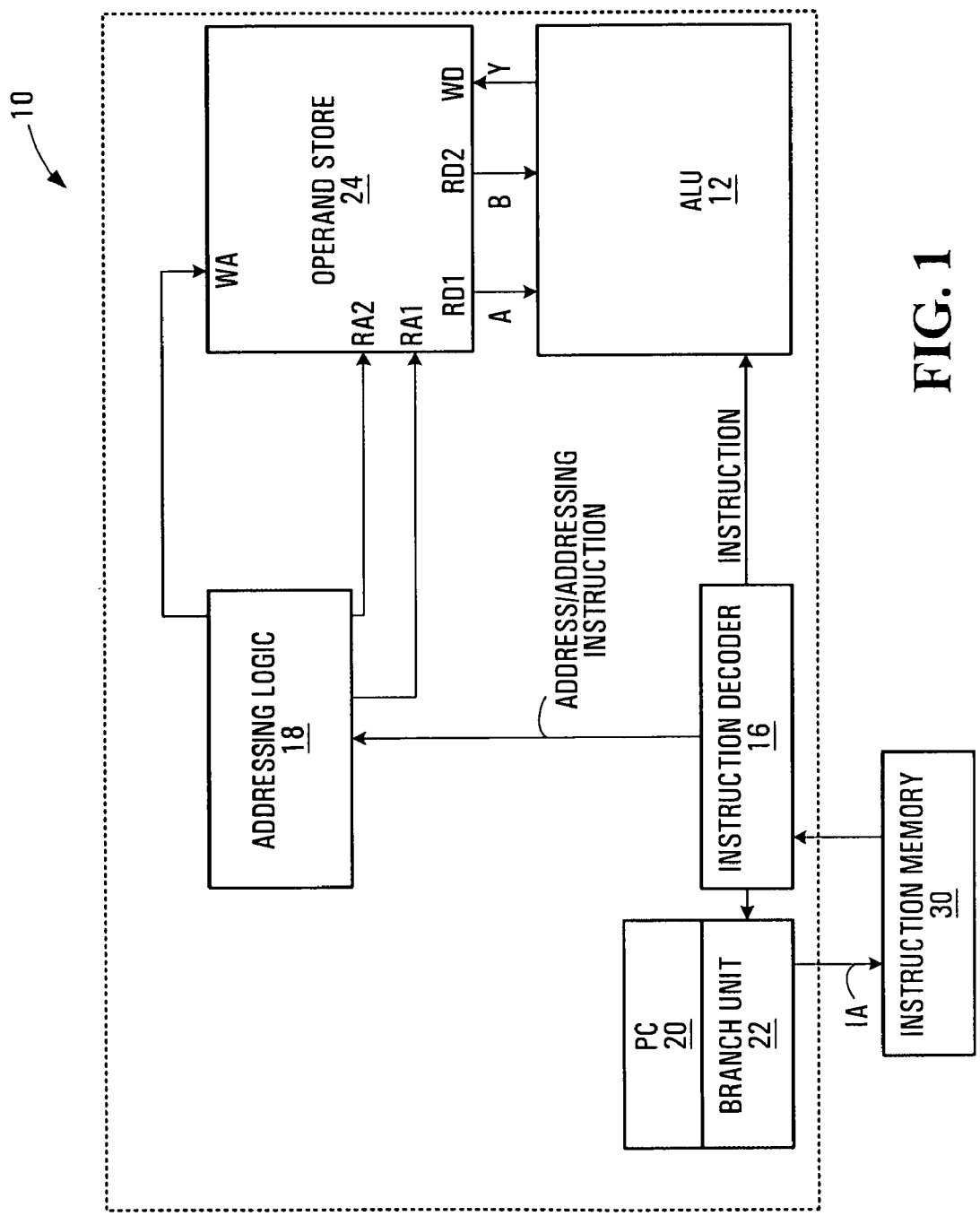
FIG. 1 is a schematic block diagram of a SIMD processor, exemplary of an embodiment of the present invention.

FIG. 1 schematically illustrates a single instruction, multiple data ("SIMD") processor 10 exemplary of an embodiment of the present invention. Processor 10 includes an arithmetic and logic unit ("ALU") 12 in communication with a plurality of registers (not specifically illustrated); instruction decoder 16; and addressing logic 18. Instruction decoder 16 is further in communication with a program counter 20 and branch unit 22.

Processor readable instructions are stored within instruction memory 30. Resulting calculations performed by processor 10 may be stored in operand storage 24 in communication with addressing logic 18. Operand storage 24 may be any combination of addressable storage elements including processor registers and memory, addressable by individual locations. In the depicted embodiment, operand storage 24 forms part of processor 10. A person of ordinary skill will readily recognize that operand storage 24 may be any suitable combination of memory and registers local to processor or computer readable memory external to processor 10. Addressing logic 18, based on instructions as decoded by instruction decoder 16 controls which elements within operand storage 24 are processed.

SIMD architecture is generally well known, and described in John L. Hennessy, David A. Patterson, David Goldberg, Computer Architecture: A Quantitative Approach (Morgan Kaufmann, 2002)—ISBN: 1558605967, the contents of which are hereby incorporated herein by reference.

As will be appreciated, processor 10 fetches instructions to be executed from instruction memory 30, at addresses specified by program counter 20. Instructions are decoded by instruction decoder 16. Branch unit 22 adjusts program counter 20 in accordance with decoded instructions. Arithmetic or logical instructions within decoded processor instructions are provided to ALU 12 which, in turn, operates on one or more operands in operand storage 24, in accordance with a decoded instruction to generate a result.

The contents of selected operands are provided from two read ports RD1 and RD2 of operand storage 24. Data from ALU 12 is written to operand storage 24 by way of data at write port WD of operand storage 24. Notably, read address lines RA1 and RA2 and write address lines WA of operand storage 24 interconnected with addressing logic 18 control read and write locations within operand storage 24 of read ports RD1, RD2 and write port WD. Conveniently, two data elements from two read addresses at read ports RD1 and RD2 may be read concurrently.

The source and destination addresses of operands and results for a particular instruction executed by processor 10 are typically specified as part of the instruction controlling the processor's operation. Generally, one or two read data memory addresses and one write data address specify locations of operands and results, and may form part of a provided instruction. These may be decoded by instruction decoder 16.

Alternatively read and write addresses may be provided indirectly based on values within registers of processor 10, as for example detailed in U.S. patent application Ser. No. 10/929,992, filed Aug. 30, 2004 naming Selvaggi et al. as inventors and entitled SIMD PROCESSOR AND ADDRESSING METHOD, now U.S. Pat. No. 7,434,024 and entitled SIMD PROCESSOR WITH REGISTER ADDRESSING, BUFFER STALL AND METHODS, the contents of which are hereby incorporated by reference.

Conveniently ALU 12 includes multiple parallel logic blocks for performing the same arithmetic or logical instruction on multiple data elements. As a result SIMD processors, generally, (and in particular SIMD processor 10) are particularly well suited for certain classes of arithmetic or logical calculations.

Figure 2:
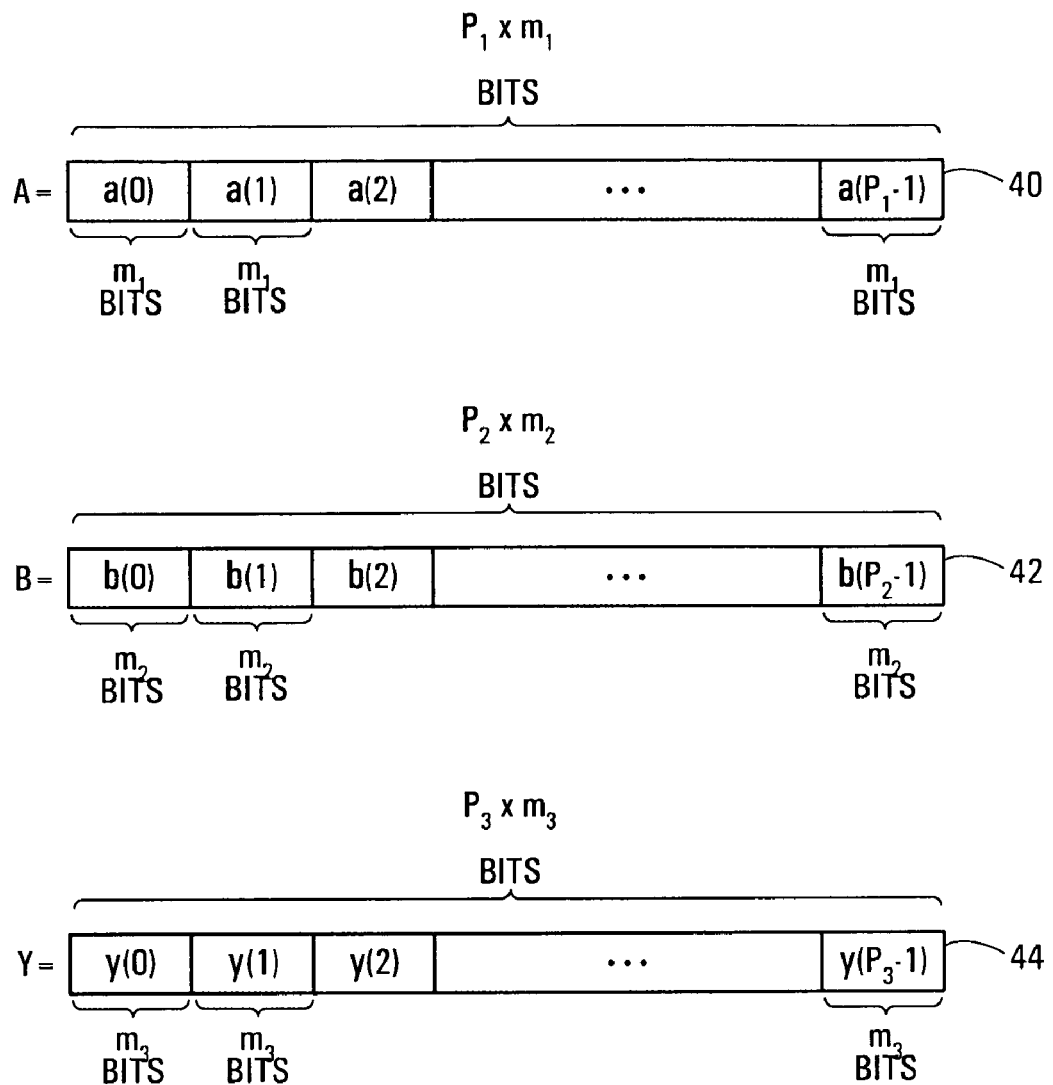
FIG. 2 is a block diagram of example operands and results accessed by the SIMD processor of FIG. 1.

The format of example operands and results (as contained in operand storage 24) is generically illustrated in FIG. 2. As illustrated, operand A 40 includes $P_1 \times m_1$ and is partitioned into $P_1$ data units of $m_1$ bits each. Operand B 42 similarly includes $P_2 \times m_2$ bits, accessible as $P_2$ data units of $m_2$ bits. Result Y 44 likewise includes $P_3 \times m_3$ bits, accessible as $P_3$ data units of $m_3$ bits. In the depicted embodiment, and without limiting the generality of possible operand sizes and result size and data unit sizes, operands A and B 40, 42 and result Y 44 each have 128 bits, and may be accessed in 8 data units of 16 bits, by processor 10 (i.e. $P_1 = P_2 = P_3 = 8$; $m_1 = m_2 = m_3 = 16$).

Now, SIMD processor 10 is adapted to execute a minimum and/or maximum instruction to assess minimum or maximum values of data units within an array, as for example contained in one or more operands A, B 40, 42, and indexes to these minimum and maximum values, in manners exemplary of embodiments of the present invention. In particular, ALU 12 includes combinational logic to assess which data unit within an array of data units has the minimum or maximum value. The array may be contained in one or more operands, and the minimum or maximum data unit among all sixteen bit data units within the operand(s) may be assessed.

Specifically, processor 10 operating on sixteen bit data units may perform instructions find_min_16; find_min_16x; lookup_min_16; and lookup_min_16x, so named for convenience. These instructions, of course are represented by suitable bit sequences recognized by instruction decoder 16. Typically, as detailed below, such an instruction takes the format: INSTRUCTION RESULT, OPERAND1; or INSTRUCTION RESULT, OPERAND1, OPERAND2, as detailed below. INSTRUCTION, RESULT, OPERAND1, OPERAND2 may each be bit portions of an instruction in memory 30 and RESULT, OPERAND1, OPERAND2 may be arranged in any order.

As will become apparent, the find_min_16 instruction instructs processor 10 to find the minimum value in an array, along with the index within the array of that value. The find_min_16x instruction may operate on data generated by the find_min_16 instruction, so when used in a hierarchical fashion, these two instructions can be applied to locate the minimum value among an arbitrary number of data units. Conveniently, use of the find_min_16 instruction in combination with the find_min_16x instruction, allows the determination of a minimum element in a two dimensional array, and row and column indexes of the minimum value in the two dimensional array.

The lookup_min_16 instruction is used to find the minimum value of a first array and the value from a second array corresponding to the index of the minimum value in the first array. The lookup_min_16x instruction may operate on the data generated by the lookup_min_16 instruction. The lookup_min_16x and lookup_min_16 may again be used in a hierarchical fashion. Use of the lookup_min_16 instruction in combination with the lookup_min_16× instruction, allows the determination of an element in a second two dimensional array, at a location indexed by row and column indexes of a minimum element in a first two dimensional array.

Specifically, the format of each of the instructions is as follows:
find_min_16: RESULT, OPERAND1
find_min_16×: RESULT, OPERAND1, OPERAND2
lookup_min_16: RESULT, OPERAND1
lookup_min_16×: RESULT, OPERAND1, OPERAND2,
where RESULT, OPERAND1, OPERAND2 identify elements within operand storage 24, as provided to or by ports WD, RD1 and RD2.

Additionally, ALU 12 may further be capable of performing complementary maximum instructions find_max_16, find_max_16×, lookup_max_16, and lookup_max_16×.

Figure 3:
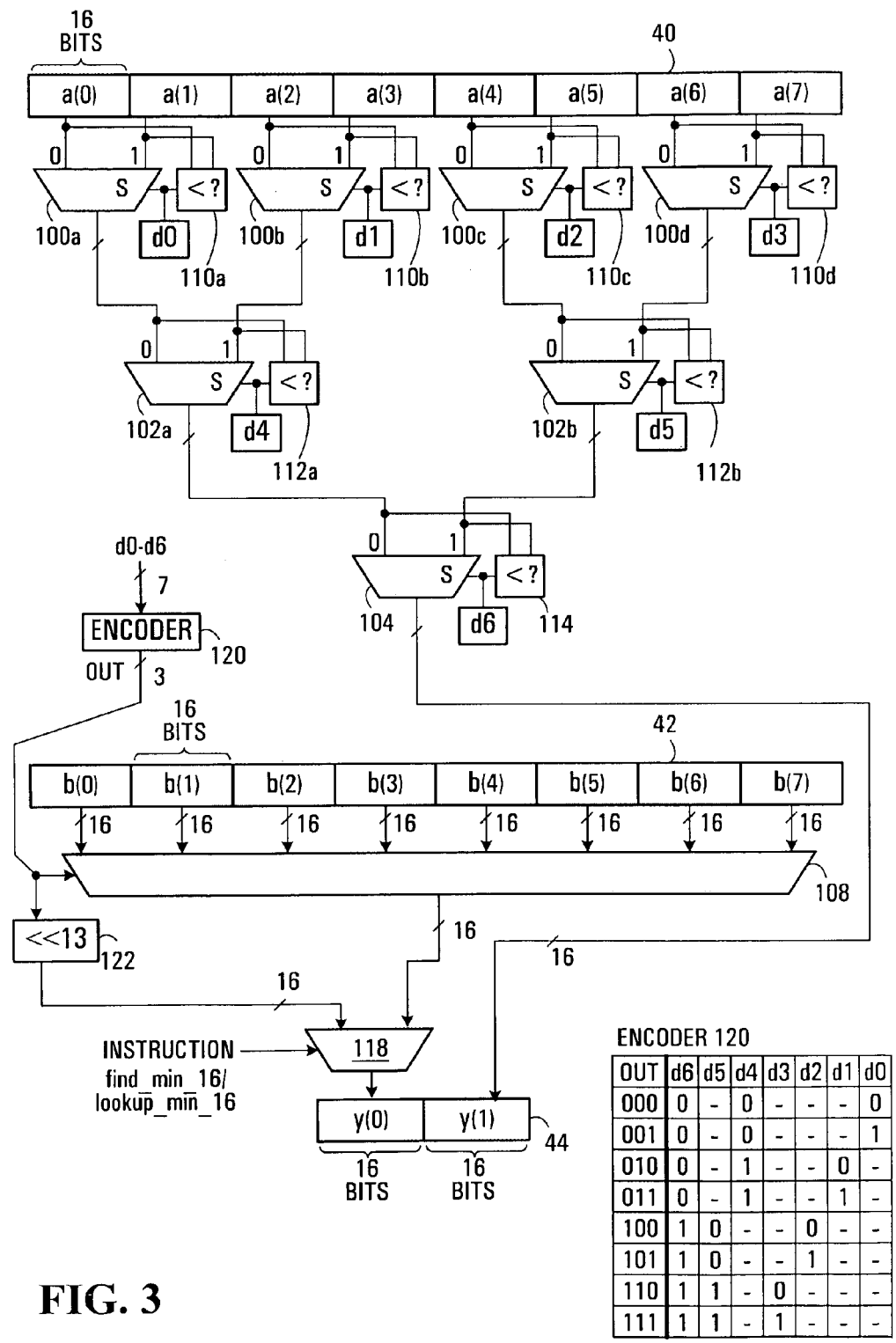
FIG. 3 is a schematic block diagram of a portion of the ALU of the SIMD processor of FIG. 1 for processing two instructions, exemplary of embodiments of the present invention.

A simplified schematic block diagram of a portion of ALU 12 operable to locate the minimum sixteen bit data unit of a first array in a first P×m operand A 40 and thus execute the find_min_16 and lookup_min_16 instruction is illustrated in FIG. 3. In the depicted embodiment, P=8 and m=16. Embodiments for other values of P and m will be readily appreciated by those of ordinary skill.

As illustrated, ALU 12 includes a first level of P/2=4 selectors 100*a*, 100*b*, 100*c* and 100*d* (individually and collectively selectors 100), receiving data elements of operand A 40. Each input receives a sixteen bit data unit of operand A 40. Each selector 100 has two sixteen bit inputs and one sixteen bit output. Which of the two inputs is presented at the output of selector 100 is determined by a select input S. The inputs of each selector 100*a*, 100*b*, 100*c*, 100*d* are further interconnected with one associated sixteen bit comparator 110—selectors 100*a*, 100*b*, 100*c* and 110*d* each associated respectively with a comparator 110*a*, 110*b*, 110*c* and 110*d*—that assesses whether the sixteen bit value at one of its sixteen bit inputs is smaller than the value at its other sixteen bit input. The output of comparator 110, in turn is provided to the select input S of the associated selector 100. As such, selector 100 outputs the smaller value of the two values at its two inputs.

A next level of two, two sixteen bit input, one sixteen bit output selectors 102*a* and 102*b* (individually and collectively selectors 102) and comparators 112*a*/112*b* receives the output of two selectors 102. Each selector 102 at this next level again selects the smallest value at its inputs. Multiple levels of selectors 100, 102, 104 and comparators 110, 112, 114, ultimately select the smallest of the eight, sixteen bit values in the sixteen bit data units of operand A 40. As will be appreciated, in order to assess the smallest of eight values, seven data selectors and seven comparators are used.

States d0, d1, ... d6 of the outputs of comparators 110, 112, 114 may further be provided to a seven to three bit encoder 120, in order to generate an index identifying the smallest sixteen bit data unit within operand A 40. The truth table for encoder 120 is depicted in FIG. 3.

Generally, to compare P values, P-1 selectors and comparators are used. Similarly a P to $\lceil \log_2 P \rceil$ bit encoder may be used.

The value of the minimum data unit in the array of operand A 42 is output to y(1) of result Y 44, for both find_min_16 and lookup_min_16 instructions.

However, depending on the instruction decoded by instruction decoder 16, y(0) of result 44 may be populated by the index of the smallest data unit in the array, or a value of a sixteen-bit data unit of a second array in second operand B 42, in the location corresponding to the location of the smallest data unit of operand A 40.

Specifically, the determined index of the smallest value data unit of the array in operand A 40 may be provided to the select input of a sixteen to one sixteen-bit data selector 108. Each sixteen-bit data input of selector 108 may, in turn, be provided with values in a second array, each value stored within a data unit of operand B 42. Selector 108, selects the sixteen bit data unit of operand B 42 in the location of the minimum sixteen bit data unit of the array in operand A 40. The output of selector 108 is provided to a further two input sixteen bit selector 118.

The index to the minimum element in operand A 40, as represented by the three bit output of encoder 120 is provided by way of 13 bit shifter 122 to the other input of selector 118. Shifter 122 ensures that the three bit output occupies the three most significant bits (i.e. left-most bits) of data unit y(0) of result 44, with the remaining thirteen bits set to 0.

Selector 118 controlled by instruction decoder 16 selects whether to provide the value of the index to the minimum value of the array in operand A 40, or the indexed value of operand B 42 to y(0) of result Y 44. Specifically, for an instruction decoded as find_min_16, the actual index value of the minimum valued sixteen bit data unit in operand A 40, as provided by encoder 120, is output by selector 118. For an instruction decoded as lookup_min_16, the value of the indexed sixteen-bit data unit in operand B 42, as indexed by the index of the minimum value of the array in operand A 40 is output.

Put another way, the find_min_16 instruction fills low and high data units y(0) and y(1) of result Y 44 with values determined as follows:

$$y(0) = \text{index}[\text{Min}\{a(0), a(1), a(2), a(3), a(4), a(5), a(6), a(7)\}] << 13;$$

$$y(1) = \text{Min}\{a(0), a(1), a(2), a(3), a(4), a(5), a(6), a(7)\}.$$

The lookup_min_16 instruction, fills low and high data units y(0) and y(1) of result 44 with values determined as follows:

$$y(0) = b(\text{index}[\text{Min}\{a(0), a(1), a(2), a(3), a(4), a(5), a(6), a(7)\}]);$$

$$y(1) = \text{Min}\{a(0), a(1), a(2), a(3), a(4), a(5), a(6), a(7)\}.$$

In the depicted embodiment, the width of the concatenated result y(0)y(1) will be 32 bits. The concatenated result y(0)y(1) is written to a result Y 44 in an addressed element of operand storage 24 by way of write port WD.

A slight reconfiguration of interconnections of selectors 100 and 108 to operate on two operands A, B 40, 42 at read ports RD1 and RD2, may allow assessment of the minimum of an array formed of eight results calculated in accordance with the find_min_16 and lookup_min_16 instruction.

Figure 4:
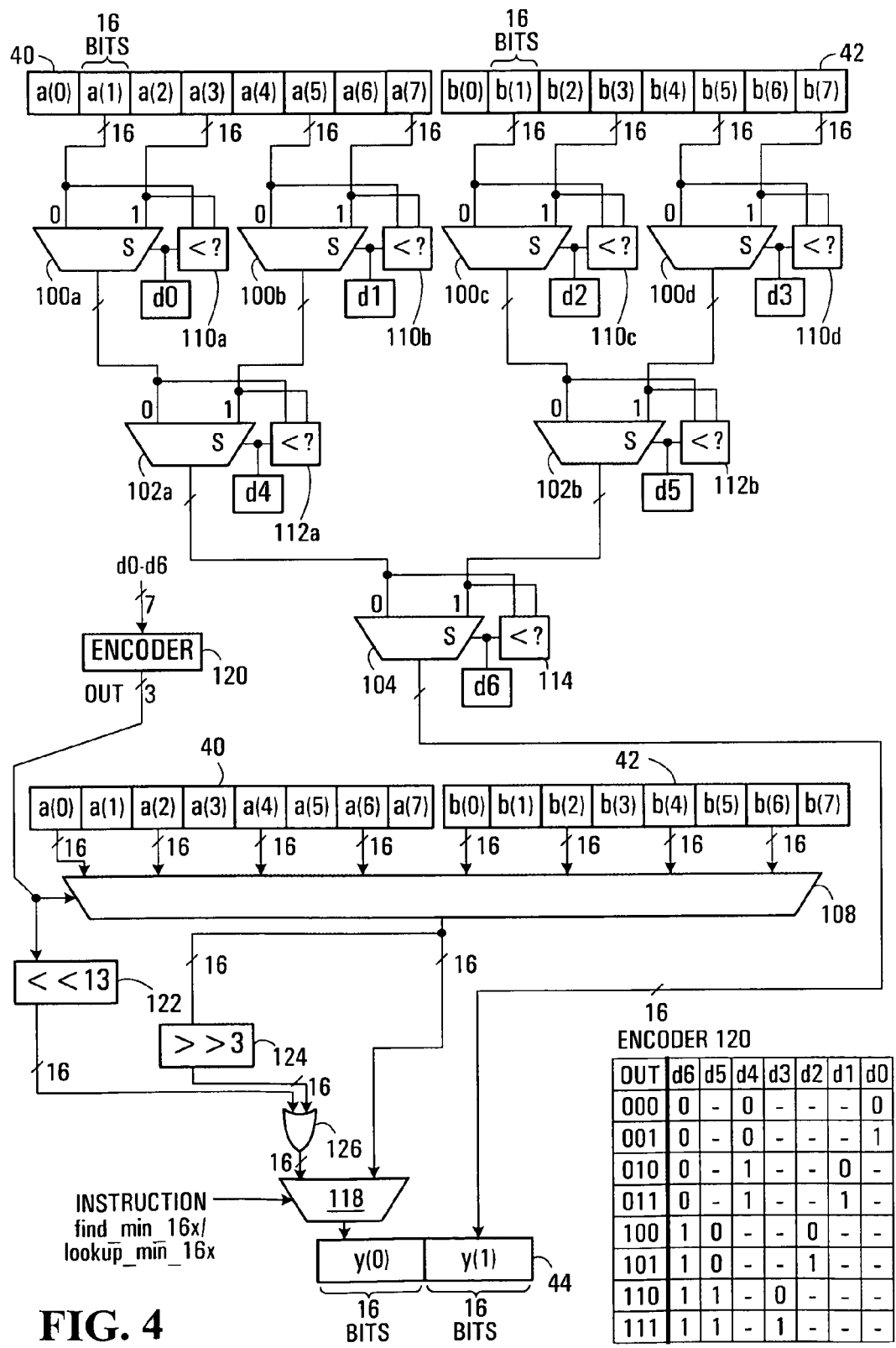
FIG. 4 is a schematic block diagram of a portion of the ALU of FIG. 1, for processing two further instructions, exemplary of embodiments of the present invention.

As illustrated in FIG. 4, providing selectors 100 with every second data unit (i.e. the odd data units) of two operands A 40 and B 42, and the remaining every second data units (i.e. the even data units) of the two operands 40 and 42 to selector 108, allows determination of find_min_16× and lookup_min_16×.

That is, an array is now effectively formed of the odd indexed data units of operands A and B 40, 42 (i.e. the array {a(1), a(3), a(5), a(7), b(1), b(3), b(5), b(7)}). Each data unit within the array is associated with a further value in the operands A, B 40, 42, stored at even indexed data units of operands A and B. This further value may represent the index value determined by a find_min_16 or the entry of a second array assessed by the lookup_min_16 instruction.

Now, find_min_16× and lookup_16× instructions both assess the minimum value in the array {a(1), a(3), a(5), a(7), b(1), b(3), b(5), b(7)}. The value of this minimum value is stored in y(1) of result Y 44 for both instructions.

The value associated with the minimum entry of {a(1), a(3), a(5), a(7), b(1), b(3), b(5), b(7)} as contained in {a(0), a(2), a(4), a(6), b(0), b(2), b(4), b(6)} may be additionally returned by either the find_min_16 or lookup_min_16× instruction. The entry of {a(0), a(2), a(4), a(6), b(0), b(2), b(4), b(6)} corresponding to the minimum entry in the array {a(1), a(3), a(5), a(7), b(1), b(3), b(5), b(7)} is selected at the output of selector 108, and may be provided directly to y(0), or combined with the index to the minimum entry in the array {a(1), a(3), a(5), a(7), b(1), b(3), b(5), b(7)} and provided to y(0).

That is, in response to decoder 16 decoding a lookup_min_16× instruction, selector 118 is toggled to provide the entry of {a(0), a(2), a(4), a(6), b(0), b(2), b(4), b(6)} corresponding to the minimum entry in the array {a(1), a(3), a(5), a(7), b(1), b(3), b(5), b(7)} as output by selector 108 directly to y(0). If operands A, B 40, 42 contain the output of eight lookup_min_16 instructions, the lookup_min_16× instruction outputs in y(0) of result Y 44, the value of a data unit in a second array, at the location corresponding to the minimum entry in the array {a(1), a(3), a(5), a(7), b(1), b(3), b(5), b(7)}.

In response to decoder 16 decoding the find_min_16× instruction, the selected value of a(0), a(2), a(4), a(6), b(0), b(2), b(4), b(6) at the output of selector 108 may be shifted left by three bits by shifter 124 and ORed by OR gate 126 with the index to the minimum entry of the array {a(1), a(3), a(5), a(7), b(1), b(3), b(5), b(7)} output by encoder 120, shifted left by thirteen bits by shifter 122, and provided to y(0). Output of encoder 120 are shifted right by 13 bits, so that the index value is contained in the three most significant bits of y(0). The output of selector 108 is logically shifted right, so that the three most significant bits of the result are 0, and the three next bits (i.e. bits [12:10]) contain the associated index contained in the selected one of {a(0), a(2), a(4), a(6), b(0), b(2), b(4), b(6)}

The high and low data units y(0) and y(1) of result 44 for the Find_min_16× will contain the values determined as follows:

$$y(0) = \text{index } [\text{Min}\{a(1), a(3), a(5), a(7), b(1), b(3), b(5), b(7)\}] \ll 13 \text{ OR index } [\text{Min } \{a(1), a(3), a(5), a(7), b(1), b(3), b(5), b(7)\}]^{th} \text{ entry of } \{a(0), a(2), a(4), a(6), b(0), b(2), b(4), b(6)\} \gg 3$$

$$y(1) = \text{Min } \{a(1), a(3), a(5), a(7), b(1), b(3), b(5), b(7)\}$$

The value of y(0) and y(1) of result 44 calculated by the Lookup_min_16× instruction will be $$y(0) = \text{Index } [\text{Min}(a(1), a(3), a(5), a(7), b(1), b(3), b(5), b(7))]^{th} \text{ entry of } \{a(0), a(2), a(4), a(6), b(0), b(2), b(4), b(6)\}$$

$$y(1) = \text{Min } \{a(1), a(3), a(5), a(7), b(1), b(3), b(5), b(7)\}$$

Again, in the depicted embodiment, the width of the concatenated result y(0)y(1) will be 32 bits.

Put another way, the lookup_min_16× instruction outputs a single value contained in the selected {a(0), a(2), a(4), a(6), b(0), b(2), b(4), b(6)} to y(0). The find_min_16× outputs two indexes in y(0): one in bits [12:0] and contained in the selected {a(0), a(2), a(4), a(6), b(0), b(2), b(4), b(6)}, and another in bits [15:13] indexing the minimum of array {a(1), a(3), a(5), a(7), b(1), b(3), b(5), b(7)}.

As may now be appreciated, application of the find_min_16 instruction to eight one dimensional arrays (e.g. several sequentially addressed elements of operand storage 24), followed by a single application of the find_min_16× instruction to concatenated results of the eight find_min_16 instructions, allows the assessment of the minimum value of a two dimensional P×P=8×8 array. y(0) resulting from the find_min_16× contains row and column indexes of the minimum data unit entry in the 8×8 array, respectively in bits [12:10] and [15:13] of y(0).

Interestingly, as the values in bits [12:0] of y(0) are shifted into these positions, the find_min_16× instruction may be used on eight results of previous find_min_16× instructions, to find the minimum value of up to 8, 8×8 arrays and indexes. That is, if find_min_16× is applied to an array of outputs previously computed with the find_min_16× instruction, bits [12:0] of y(0) will contain row and column index values previously calculated by the find_min_16× instruction. Finding the minimum of eight such entries, effectively assesses the location of the minimum entry in eight two dimensional 8×8 arrays. As 13 bits are available to store previously computed indexes, further iterative application of the find_min_16× instruction is also possible. Alternatively, results of the find_min_16× instructions could be stored, in order to find the minimum valued data entry of an arbitrarily large (N×8)×(M×8) array.

Application of the lookup_min_16 instruction to eight one dimensional array followed by a single application of the lookup_min_16× instruction to concatenated results, similarly allows determination of an entry in a second 8×8 array corresponding to the minimum entry in a first 8×8 array. Similarly, application of the lookup_min_16× instructions to the results for numerous 8×8 array, allows assessment of the minimum value in an arbitrarily large (N×8)×(M×8) array.

The results of eight find_min_16 of lookup_min_16 instructions may be stored in memory storage units of operand storage 24, using SIMD addressing techniques detailed in U.S. patent application Ser. No. 10/929,992 filed Aug. 30, 2004 and entitled SIMD PROCESSOR AND ADDRESSING METHOD.

Complementary maximum instructions find_max_16, find_max_16×, Lookup_max_16, and lookup_max_16× may be performed at ALU 12 simply by inverting the output of comparators 110, 112 and 114. A control input to these comparators could thus be driven by instruction decoder 16.

SIMD processors and ALUs exemplary of embodiments of the present invention may be formed using conventional manufacturing techniques, including very large scale integration techniques.

Of course, the above described embodiments are intended to be illustrative only and in no way limiting. The described embodiments of carrying out the invention are susceptible to many modifications of form, arrangement of parts, details and order of operation. The invention, rather, is intended to encompass all such modification within its scope, as defined by the claims.

What is claimed is:

1. In a single instruction multiple data (SIMD) processor, a method of processing a single processor readable instruction, said method comprising:
   determining the minimum valued data unit in a first array of data units;
   outputting a first value of said minimum valued data unit;
   outputting an index value indexing said minimum valued data unit in said first array; and
   using said index value to determine a second value using a second array of data units.

2. The method of claim 1, wherein said first array is an operand comprising P of said data units.

3. The method of claim 2, wherein each of said data units has m bits, and said operand is stored within a P×m bit memory location of processor readable memory.

4. The method of claim 3, wherein said location of processor readable memory is identified in said single instruction.

5. The method of claim 2, further comprising performing P-1 comparisons to determine said minimum valued data unit.

6. The method of claim 4, wherein said single instruction includes INSTRUCTION, RESULT, OPERAND1 portions wherein OPERAND1 identifies said location of processor readable memory, and RESULT specifies a further location of said processor readable memory for said outputting said minimum value and said index value.

7. The method of claim 1, wherein said first array comprises P data units contained in a plurality of operands.

8. The method of claim 7, wherein each of said P data units is associated with an associated value within said plurality of operands, and wherein said method further comprises determining the associated value associated with said minimum valued data unit in said first array.

9. The method of claim 8, wherein said single instruction includes INSTRUCTION, RESULT, OPERAND1, OPERAND2 portions, wherein OPERAND1 and OPERAND2 specify addresses of said plurality of operands in processor readable memory.

10. In a single instruction multiple data (SIMD) processor, a method of processing a single processor readable instruction, said method comprising:
determining the minimum valued data unit in a first array of data units;
determining an index value indexing said minimum valued data unit in said first array;
using said index value to select a data unit in a second array; and
outputting a value of said data unit in said second array by way of control provided by an instruction decoder decoding said single processor readable instruction.

11. The method of claim 10, wherein said single instruction includes INSTRUCTION, RESULT, OPERAND1, OPERAND2 portions, wherein OPERAND1 specifies an address of said first array, and OPERAND2 specifies an address of said second array.

12. The method of claim 10, wherein said second array is stored within a P×m bit memory location within processor readable memory.

13. A single instruction multiple data (SIMD) processor comprising:
an arithmetic logic unit (ALU) for receiving values from a P data unit array from operand storage;
said ALU comprising P-1 comparators, for comparing said P data units in response to a single processor executable instruction, in order to determine a minimum value from one of said P data units.

14. The SIMD processor of claim 13, wherein said values from said P data unit array is stored in a single operand provided to said ALU.

15. The SIMD processor of claim 13, wherein said values from said P data unit array is stored in first and second operands provided to said ALU.

16. The SIMD processor of claim 13, further comprising a selector for providing said minimum value from said one of said P data units from said ALU to said operand storage.

17. The SIMD processor of claim 13, further comprising an encoder for encoding the state of said P-1 comparators into a $\lceil \log_2 P \rceil$ bit value to
produce an index to said one of said P data units.

18. The SIMD processor of claim 14, wherein said ALU receives a second P data unit operand from operand storage, concurrently with said P data unit operand, and further comprising:
a selector for providing one of said data units in said second P data units, as indexed by an index identifying said minimum value from said one of said P data units.

19. The SIMD processor of claim 14, further comprising an instruction decoder for decoding said single instruction having INSTRUCTION, RESULT, OPERAND1 portions wherein OPERAND1 specifies a memory location in said operand storage storing said single operand.

20. In a single instruction multiple data (SIMD) processor, a method of processing a single processor readable instruction, said method comprising:
determining the maximum valued data unit in a first array of data units;
outputting a first value of said maximum valued data unit;
outputting an index value indexing said maximum valued data unit in said first array; and
using said index value to determine a second value using a second array of data units.

21. The method of claim 20, wherein said first array is an operand comprising P of said data units.

22. The method of claim 21, wherein each of said data units has m bits, and said operand is stored within a P×m bit memory location of processor readable memory.

23. The method of claim 22, wherein said location of processor readable memory is identified in said single instruction.

24. The method of claim 21, further comprising performing P-1 comparisons to determine said maximum valued data unit.

25. The method of claim 23, wherein said single instruction includes INSTRUCTION, RESULT, OPERAND1 portions wherein OPERAND1 identifies said location of processor readable memory, and RESULT specifies a further location of said processor readable memory for said outputting said maximum value and said index value.

26. The method of claim 20, wherein said first array comprises P data units contained in a plurality of operands.

27. The method of claim 26, wherein each of said P data units is associated with an associated value within said plurality of operands, and wherein said method further comprises determining the associated value associated with said maximum valued data unit in said first array.

28. The method of claim 27, wherein said single instruction includes INSTRUCTION, RESULT, OPERAND1, OPERAND2 portions, wherein OPERAND1 and OPERAND2 specify addresses of said plurality of operands in processor readable memory.

29. In a single instruction multiple data (SIMD) processor, a method of processing a single processor readable instruction, said method comprising:
determining the maximum valued data unit in a first array of data units;
determining an index value indexing said maximum valued data unit in said first array;
using said index value to select a data unit in a second array; and
outputting a value of said data unit in said second array by way of control provided by an instruction decoder decoding said single processor readable instruction.

30. The method of claim 29, wherein said single instruction includes INSTRUCTION, RESULT, OPERAND1, OPER- AND2 portions, wherein OPERAND1 specifies an address of said first array, and OPERAND2 specifies an address of said second array.

31. The method of claim 29, wherein said second array is stored within a P×m bit memory location within processor readable memory.

32. A single instruction multiple data (SIMD) processor comprising:
  an arithmetic logic unit (ALU) for receiving values from a P data unit array from operand storage;
  said ALU comprising P-1 comparators, for comparing said P data units in response to a single processor executable instruction, in order to determine a maximum value from one of said P data units.

33. The SIMD processor of claim 32, wherein said values from said P data unit array is stored in a single operand provided to said ALU.

34. The SIMD processor of claim 32, wherein said values from said P data unit array is stored in first and second operands provided to said ALU.

35. The SIMD processor of claim 32, further comprising a selector for providing said maximum value from said one of said P data units from said ALU to said operand storage.

36. The SIMD processor of claim 32, further comprising an encoder for encoding the state of said P-1 comparators into a $\lceil \log_2 P \rceil$ bit value to produce an index to said one of said P data units.

37. The SIMD processor of claim 33, wherein said ALU receives a second P data unit operand from operand storage, concurrently with said P data unit operand, and further comprising:
  a selector for providing one of said data units in said second P data units, as indexed by an index identifying said maximum value from said one of said P data units.

38. The SIMD processor of claim 33, further comprising an instruction decoder for decoding said single instruction having INSTRUCTION, RESULT, OPERAND1 portions wherein OPERAND1 specifies a memory location in said operand storage storing said single operand.

* * * * *